US005662876A

United States Patent [19]
Tour et al.

[11] Patent Number: 5,662,876
[45] Date of Patent: *Sep. 2, 1997

[54] PURIFICATION OF FULLERENES

[75] Inventors: James M. Tour; Walter A. Scrivens, both of Columbia, S.C.; Peter V. Bedworth, Pasadena, Calif.

[73] Assignee: University of South Carolina, Columbia, S.C.

[*] Notice: The term of this patent shall not extend beyond the expiration date of Pat. No. 5,310,532.

[21] Appl. No.: 238,640

[22] Filed: May 5, 1994

Related U.S. Application Data

[63] Continuation-in-part of Ser. No. 896,193, Jun. 10, 1992, Pat. No. 5,310,532.
[51] Int. Cl.$^6$ ................................................. C01B 31/00
[52] U.S. Cl. ............................ 423/445 B; 423/DIG. 39; 423/461
[58] Field of Search ........................ 423/445 B, DIG. 39, 423/461

[56] References Cited

U.S. PATENT DOCUMENTS 5,310,532  5/1994  Tour et al. ............................ 423/445 B

FOREIGN PATENT DOCUMENTS

| | | | |
|---|---|---|---|
| 5-24814 | 2/1993 | Japan | 423/DIG. 40 |
| 5085711 | 4/1993 | Japan . | |
| 9204279 | 3/1992 | WIPO . | |
| 93-01128 | 1/1993 | WIPO . | |

OTHER PUBLICATIONS

Lamb, L.D., et al. "Fullerene Production", Journal of Physics and Chemistry of Solids (1993), vol. 54, #12, pp. 1635–1643.

Scrivens, W.A., et al. "Purification of Gram Quantities of C60 . . .", Journal of American Chemical Society, vol. 114 (1992), pp. 7917–7919.

Ruoff, R.S., et al. "Solubility of $C_{60}$ in a Variety of Solvents", J. Phys. Chem., 97, pp. 3379–3383 (Published 01 Apr. 1993).

Scrivens, W.A., et al. J. Am. Chem. Soc. (1994), 116, pp. 6939–6940.

Scrivens, W.A., Bedworth, P.V., and Tour, J.M., "Purification of Gram Quantities of $C_{60}$. A New Inexpensive and Facile Method", Journal of American Chemical Society, 114, 1992.

Ajie et al., "Characterization of the Soluble All–Carbon Molecules $C_{60}$ and $C_{70}$", J. Phys. Chem. 1990; 94:8630–8633.

Chatterjee et al., "Fast One–Step Separation and Purification of Buckminsterfullerene, $C_{60}$, from Carbon Soot", J. Org. Chem. 1992; 57(11):3253–3254.

Diederich et al., "Fullerene Isomerism: Isolation of $C_{2v}$–$C_{78}$", Science 1991; 254:1768–1770.

Diederich et al., "The Higher Fullerenes: Isolation and Characterization of $C_{76}$, $C_{84}$, $C_{90}$, $C_{94}$, and $C_{70}O$, an Oxide of $D_{5h}$–$C_{70}$", Science 1991; 252:548–551.

Hare et al., "Preparation and UV/visible spectra of fullerenes $C_{60}$ and $C_{70}$", Chem. Phys. Lett. 1991; 177(4–5):394–398.

Haufler et al., "Efficient Production of $C_{60}$ (Buckminsterfullerene), $C_{60}H_{36}$, and the Solvated Buckide Ion", J. Phys. Chem. 1990; 94(24):8634–8636.

Howard et al., "Fullerenes $C_{60}$ and $C_{70}$ in flames", Nature 1991; 352:139–141.

Jinno et al., "Liquid chromatographic separation of all–carbon molecules $C_{60}$ and $C_{70}$ with multi–legged phenyl group bonded silica phases", J. Chromatogr. 1992, 594:105–109.

Khemani et al., "A Simple Soxhlet Chromatographic Method for the Isolation of Pure $C_{60}$ and $C_{70}$", J. Org. Chem. 1992; 57:3254–3256.

Koch et al., "Preparation of Fullerenes with a Simple Benchtop Reactor", J. Org. Chem. 1991; 56(14):4543–4545.

Krätschmer et al., "The infrared and ultraviolet absorption spectra of laboratory–produced carbon dust: evidence for the presence of the $C_{60}$ molecule", Chem. Phys. Lett. 1990; 170(2–3):167–170.

Krätschmer et al., "Solid $C_{60}$: a new form of carbon", Nature 1990; 347:354–358.

Kroto et al., "$C_{60}$: Buckminsterfullerene", Nature 1985; 318:162–163.

McLafferty, Acc. Chem. Res. 1992; 25(3):97–175.

Meier et al., "Efficient Preparative Separation of $C_{60}$ and $C_{70}$ Gel Permeation Chromatography of Fullerenes Using 100% Toluene as Mobile Phase", J. Org. Chem. 1992; 57(6):1924–1926.

Parker et al., "High–Yield Synthesis, Separation, and Mass–Spectrometric Characterization of Fullerenes $C_{60}$ to $C_{266}$", J. Am. Chem. Soc. 1991; 113(20):7499–7503.

Peters et al., "A New Fullerene Synthesis", Angew. Chem. Int. Ed. Engl. 1992; 31(2):223–224.

Pradeep et al., "Preparation of Buckminsterfullerene, $C_{60}$", Mat. Res. Bull. 1991; 26:1101–1105.

Pradeep et al., "A Novel $FeC_{60}$ Adduct in the Solid State", J. Am. Chem. Soc. 1992; 114:2272–2273.

Shinohara et al., "Formation and Extraction of Very Large All–Carbon Fullerenes", J. Phys. Chem. 1991; 95:8449–8451.

(List continued on next page.)

*Primary Examiner*—Michael Lewis
*Assistant Examiner*—Peter T. DiMauro
*Attorney, Agent, or Firm*—Brumbaugh, Graves, Donohue & Raymond

[57] ABSTRACT

A low-cost and facile method of purifying fullerenes to obtain a preparation enriched in a fullerene of selected molecular weight using activated carbon involves adding a fullarena mixture to the top end of a column comprising activated carbon, passing a solvent in which the selected molecular weight fullerene is soluble through the column, and recovering a fraction enriched in the selected molecular weight fullerene from the bottom end of the column. In addition to activated carbon, the column may further comprise silica gel, diatomaceous earth, or other materials which aid in column packing and eluent flow. The invention also provides for preparation of gram quantities of pure $C_{60}$ and $C_{70}$ fullerenes after a single column pass.

11 Claims, No Drawings

OTHER PUBLICATIONS

Still et al., "Rapid Chromatographic Technique for Preparative Separations with Moderate Resolution", J. Org. Chem. 1978; 43(14):2923–2925.

Taylor et al., "Isolation, Separation and Characterization of the Fullerenes $C_{60}$ and $C_{70}$: The Third Form of Carbon", J. Chem. Soc. Commun. 1990; 20:1423–1425.

Vassallo et al., "Improved Separation of Fullerene –60 and –70", J. Chem. Soc., Chem. Commun. 1992; 1:60–61.

Zhennan et al., "Buckminsterfullerene $C_{60}$: Synthesis, Spectroscopic Characterization, and Structure Analysis", J. Phys. Chem. 1991; 95(24):9615–9618.

Baum, Rudy M., "Flood of Fullerene Discoveries Continues Unabated", Chem. & Eng. News, Jun. 1, 1992, 25–31.

Darwish, Adam D., et al., "Improved Chromatographic Separation of $C_{60}$ and $C_{70}$", J. Chem. Soc., Chem. Commun. 1994, 15–16.

Giddings et al., "Advances In Chromatography", Adsorbents in Gas Chromatography 1967; 4: 127–143.

Heftmann, "Chromatography", Fundamentals of Chromatography 1967; 2nd Edition, 46–54.

Kirk, et al., "Carbon (Active)", Encyclopedia of Chemical Technology 1948 2:886–890.

Kirk, et al., "Carbon (Carbon and Artificial Graphite)", Encyclopedia of Chemical Technology 1978, 3rd Edition, 4:561–569.

Olsen, "Heat and Power", Unit Processes and Principles of Chemical Engineering 1932, 1–3.

Scrivens et al., "Potent Solvents for $C_{60}$ and Their Utility for the Rapid Acquisition of $^{13}C$ NMR Data for Fullerenes", J. Chem. Soc., Chem. Commun. 1993, 1207–1209.

PURIFICATION OF FULLERENES

This application is a continuation-in-part of U.S. Ser. No. 07/896,193 filed Jun. 10, 1992, now U.S. Pat. No. 5,310,532, which is incorporated by reference herein. This invention was made with the support of the United States Government under National Science Foundation Grant Nos. DMR-9158315 and EHR-9108772, and Office of Naval Research Young Investigation Award N00014-89-J-3062. The Government has certain rights in this invention. This invention relates to a low cost and facile method for purification of fullerenes. This invention also relates to a composition of matter comprising a fullerene adsorbed onto a solid support comprising active carbon. The solid support may further comprise silica gel, diatomaceous earth, or other materials which aid in column packing and eluent flow.

BACKGROUND OF THE INVENTION

Fullerenes are Carbon cages containing a central cavity. These molecules with the composition $C_{20}+2m$, where m is an integer, can take the stable form of hollow closed nets composed of pentagons and hexagons. The discovery of Buckminsterfullerene, a $C_{60}$ spherical allotrope of carbon, in 1985 by Kroto, H. W., Heath, J. R., O'Brien, S. C., Carl, R. F., Smalley, R. E.; "$C_{60}$: Buckminsterfullerene"; Nature, Vol. 318, November 1985, pp. 162–163 has precipitated a flurry of activity directed towards understanding the nature and properties of fullerenes, particularly their use as lubricants, semiconductors and superconductors. This research has been significantly hampered by the difficulty in obtaining gram or larger quantities of pure materials.

To date, fullerenes have been synthesized using a laser to ablate graphite, burning graphite in a furnace or by producing an arc across two graphite electrodes in an inert atmosphere. By impregnating graphite with metal salts or oxides, or conducting the vaporization in a metal containing atmosphere, a metal encapsulated in a fullerene can be synthesized. Other techniques applied to synthesize fullerenes include negative ion/desorption chemical ionization and a benzene flame. In each case, a soot comprising a mixture of $C_{60}$ and $C_{70}$ fullerenes, and even higher numbered carbon molecules is obtained. For example, carbon arc soot contains about 65–85% $C_{60}$, 10–35% $C_{70}$, and 5% higher fullerenes.

The first and still most commonly used method for purifying crude $C_{60}$ fullerene is by column chromatography on activity grade I neutral alumina using 5% toluene in hexane as the eluent. However, $C_{60}$ fullerene is only very slightly soluble in toluene/hexane (5/95) and this low solubility requires the use of large quantities of solvent and Very large columns. The use of larger fractions of toluene in hexane afford no separation of $C_{60}$ from the higher fullerenes. Using this method to purify 500 mg of crude fullerenes requires large quantities of materials; 2500 g of alumina and about 12 liters of solvent making the process relatively expensive. AnOther disadvantage of this method is that alumina having a high activity, i.e., grade I alumina, tends to irreversibly adsorb $C_{60}$. During a typical separation procedure, only about 50% out of a possible 80% of $C_{60}$ present in the crude can be recovered. Purification using this method can take as long as 8–12 hours due to the large size of the columns necessary to purify 500 mg of crude fullerenes.

In another chromatographic method, powdered graphite has been used as the stationary phase. Vassallo, A. M.; Palisano, A. J.; Pang, L. S. K., Wilson, M. A.; "Improved Separation of Fullerene –60 and –70"; J. Chem. Soc., Chem. Comm., 1, pp. 60–61 (1992). Higher toluene concentrations (10% toluene in hexane) make it possible to use less solvent. However this method yields a poor recovery of $C_{60}$, typically giving only 32% pure $C_{60}$ as compared to a possible 80% yield.

Gel permeation chromatography (GPC) has also been used for $C_{60}$ purification. Meier, M. S., Selegue, J. P.; "Efficient Preparative Separation of $C_{60}$ and $C_{70}$ Gel Permeation Chromatography of Fullerenes Using 100% Toluene as Mobile Phase"; J. Org. Chem., 57, pp. 1924–1926 (1992). In this technique 100% toluene is the eluent. Since $C_{60}$ is more soluble in toluene than in toluene hexane mixtures, this technique has the advantage of requiring smaller solvent volumes. This method gives 50% recovery of $C_{60}$ out of a possible 80%, with the remaining $C_{60}$ eluting as an impure fraction that requires multiple re-injection and purification steps. The major disadvantages of this method are the need for an high pressure liquid chromatography (HPLC)/GPC apparatus, the tremendous cost of the separation columns, and the inapplicability for near gram scale separations.

Finally, a method of chromatographic purification of $C_{60}$ using multi-legged phenyl groups bound to silica gel as a stationary phase has been reported. Jinno, K., Kunihiko, Y., Takanori U., Hideo N., Kenji, I.; "Liquid Chromatographic Separation of All-Carbon Molecules $C_{60}$ and $C_{70}$ With Multi-Legged Group Bonded Silica Phases"; J. Chromatogr., 594, pp. 105–109 (1992). This method necessitates the utilization of custom-made stationary phases and has only been demonstrated for analytical scale separations, not for preparative purposes.

SUMMARY OF THE INVENTION

The present invention relates to a facile low-cost method of purifying a mixture of fullerenes to obtain a preparation enriched in a fullerene of a selected molecular weight, comprising adding a fullerene mixture to the top end of a column comprising activated carbon, passing a solvent in which the selected molecular weight fullerene is soluble through the column, and recovering a fraction enriched in the fullerene of the selected molecular weight from the bottom end of the column. The present invention also relates to a method of purifying a mixture of fullerenes to obtain a preparation enriched in a fullerene of a selected molecular weight comprising adding a fullerene mixture to the top end of a column comprising activated carbon, passing a solvent for $C_{60}$ fullerene selected from the group consisting of aromatics, heteroaromatics and halogenated hydrocarbons and mixtures thereof through the column, recovering a fraction enriched in a $C_{60}$ fullerene from the bottom end of the column, passing a chlorinated aromatic solvent through the column, and recovering a fraction enriched in a fullerene having a molecular weight greater than $C_{60}$ from the bottom end of the column.

This invention further relates to a composition of matter comprising a fullerene adsorbed onto a solid support comprising activated carbon. The solid support may further comprise silica gel, diatomaCeous earth, or other material that aids in the packing of the activated carbon stationary phase.

DETAILED DESCRIPTION OF THE INVENTION

In the present invention, a fullerene of selected molecular weight is separated from a mixture of fullerenes using a column of activated carbon. Fullerene includes any fullerene or fullerene derivative, including metal encapsulating fullerene derivatives or metallic fullerene endohedral complexes, metallic fullerene exohedral complexes, and substituted fullerene derivatives or fulleroids. The purified fullerene is eluted from the activated carbon by passing a solvent in which the pure fullerene is soluble through the activated carbon.

Suitable eluting solvents include aromatic, heteroaromatic and halogenated hydrocarbon solvents in which the fullerene is soluble. SUitable aromatic solvents include mesitylene, benzene, toluene, xylene and combinations thereof. Toluene is a preferred eluting solvent for recovery of $C_{60}$ fullerenes as it is less toxic than benzene and has a lower boiling point than xylene. Suitable solvents also include halogenated, preferably chlorinated, aromatics, alkyls, alkyenes, and alkynes, as well as perhalogenated carbons such as carbon tetrachloride. Suitable heteroaromatics contain sulfur, oxygen or nitrogen atoms, for example, pyridine. Ortho-dichlorobenzene is a preferred eluting solvent for recovery of $C_{70}$ and higher fullerenes.

Surprisingly, it has been found that activated carbon, an inexpensive and readily available material, provides for efficient separation of gram quantities of a fullerene of a selected molecular weight from a mixture of fullerenes. Typically, activated carbon has a surface area of $2 \times 10^4$ to $6 \times 10^4$ cm$^2$ per gram. Activated carbon is not pure carbon; many noncarbon elements are present and are attached to the carbon atoms by chemical bonds. During the activation process, carbonized raw material, for example charcoal, is oxidized using suitable gases. Activated carbon can be divided into two classes, polar (oxidized) and nonpolar (graphitized). Preferred activated carbons have a particle size of 37–841µ (20–400 mesh) and lie in between the two polar and nonpolar classes. A most preferred activated carbon is alkaline Norit®-A having a particle size greater than 149µ (<100 mesh) available from Fisher Scientific Company, Pittsburgh, Pa.

In the present invention, activated carbon may be used alone or it may be used in combination with other materials, preferably nonreactive solids which aid in column packing and eluent flow. Preferred non-reactive solids include silica gel and diatomaceous earth. Preferably the ratio by weight of activated carbon to silica gel or activated carbon to diatomaceous earth is 1:2 or 1:1, respectively.

The purification method according to the invention can be carried out using inexpensive, easily assembled laboratory equipment such as a flash chromatography apparatus, as described by Still, W. Clark, Kahn, Michael, Mitra, Abhijct; "Rapid Chromatographic Technique for Preparative Separations with Moderate Resolution"; J. Org; Chem., Vol. 43, No. 14 pp. 2923–2925 (1978). Flash chromatography is a technique in which eluent solvent is driven through a chromatography column by applying a medium pressure, 5 to 10 p.s.i. of a gas.

In addition, the column can be run under gravity feed conditions at atmospheric pressure. Moreover, by using a column of a material which can withstand high pressures, for example stainless steel, high pressures up to 5000 p.s.i. can be applied to one end of the column.

EXAMPLE 1

Purification Using Activated Carbon 500 mg of crude $C_{60}$ was dissolved in 100 mL of toluene. This solution was poured onto the top of a standard 2 cm diameter, 50 cm long liquid chromatography column that had been slurry-packed with 12 grams of Norit®-A and plugged at the bottom with cotton. The column was then pressurized to 10 p.s.i. with a nitrogen head pressure and eluted with toluene at the rate of 2 mL/min. Fractions were collected for the next 300 mL during which most of the $C_{60}$ had eluted as a deep purple solution. The fractions were combined and solvent was removed by rotary evaporation to give 375 mg of pure $C_{60}$. The material was characterized by mass spectrometry and $^{13}C$ NMR and was shown to be >95% pure.

EXAMPLE 2

Purification Using Activated Carbon And Silica Gel 500 mg of crude $C_{60}$ was dissolved in 100 mL of distilled toluene. This solution was poured onto the top of a standard 2 cm diameter, 50 cm long liquid chromatography column that had been slurry-packed with a mixture of 9 g Norit®-A and 18 g flash chromatography grade silica gel, having a particle size of 37–63µ (230–400 mesh), available from EM Science, in Gibbstown, N.J. While, silica gel aided in the packing of the column so that the fractions ran more quickly and evenly; numerous uniform solids could also be used for this purpose. The column was then pressurized to 10 p.s.i. with a nitrogen head pressure and eluted at the rate of 5 mL/min. Fractions were collected for the next 250 mL during which most of the $C_{60}$ had eluted as a deep purple solution. The fractions were combined and solvent was removed by rotary evaporation to give 333 mg of pure $C_{60}$. The material was characterized by mass spectrometry and $^{13}C$ NMRand was shown to be >95% pure.

In each of the above examples, not only is a high purity $C_{60}$ fullerene recovered, but a $C_{70}$ fraction containing some $C_{60}$ is eluted having a reddish-brown color. By rechromatographing this $C_{70}$ fraction over two columns, as described herein, an enriched $C_{70}$ fraction which is 3:1 by weight $C_{70}:C_{60}$ can be obtained.

EXAMPLE 3

Purification Using Ortho-Dichlorobenzene 100 mg of crude fullerene was dissolved in 35 mL of ortho-dichlorobenzene. This solution was poured onto the top of a 15 cm long column having a 12 mmdiameter that had been slurry packed with 5.4 g of a mixture of 1:2 by weight Norit®-A and flash chromatography silica gel, having a particle size of 37–63µ. Silica gel aided in the packing of the column and helped prevent cracking. The column was then pressurized to 7 p.s.i. with a nitrogen head pressure and eluted with ortho-dichlorobenzene. Fractions were collected for the next 25 mL during which 63.3 mg of $C_{60}$ eluted as a deep purple solution. Fractions were collected for the next 35 mL during which 25 mg of fullerenes having a molecular weight greater than $C_{60}$ eluted as a brown solution.

EXAMPLE 4

Multiple Column Purification 300 mg of crude fullerenes was dissolved in 110 mL of toluene. This solution was poured onto the top of a standard 2 cm, 50 cm long liquid chromatography column that had been slurry packed with a mixture of 5.4 g of Norit®-A and 10.8 of flash chromatography silica gel, having a particle size of 37–63µ. The column was then pressurized to 10 p.s.i. with a nitrogen head pressure and eluted at the rate of 7 mL/min using toluene as the mobile phase. Fractions having a deep purple color (Fraction 1) were collected. These deep color fractions yielded 130.4 mg of $C_{60}$ fullerene. After colorless fractions were collected, the mobile phase was changed to pure ortho-dichlorobenzene. Fractions having brown color (Fraction 2) were collected until the color tapered off. Approximately another 150 mL of ortho-dichlorobenzene was passed through the column and collected as Fraction 3 until the light brown color tapered off. Another 150 mL of ortho-dichlorobenzene was passed through the column and collected as Fraction 4 until the light brown color tapered off. Fraction 2 yielded 124.5 mg of solid material, Fraction 3 yielded 10.2 mg of a solid material, Fraction 4 yielded 2.5 mg of solid material. The combined weight of all the fractions yield a total recovery of 91.6% of starting material.

Fractions 2, 3 and 4 were combined and dissolved in 45 mL of toluene. This solution was poured onto the top of a 2 cm diameter column that had been slurry packed with a mixture of 2.25 g of Norit®-A and 4.5 g of flash chromatography silica gel. The column was then pressurized to 10 p.s.i. with a nitrogen head pressure and eluted at the rate of 7 mL/min using toluene as the mobile phase. A deep purple fraction yielded 31.0 mg of $C_{60}$ fullerene. After colorless fractions were collected, the mobile phase was changed to pure ortho-dichlorobenzene. Fractions having a red/brown color were collected yielding 73.7 mg of solid material.

The 73.7 mg of solid material was dissolved in 75 mL toluene and put through a new column slurry packed with a mixture of 2.25 g of Norite-A and 4.5 g of flash chromatography silica gel, and pressured to 10 p.s.i. with nitrogen as described above. After passing toluene through the column failed to elute a purple fraction, the mobile phase was changed to ortho-dichlorobenzene. Fractions having a reddish brown color were collected. These fractions contained 38 mg of material shown to be greater than 98% pure $C_{70}$ fullerene by high pressure liquid chromatography (HPLC).

EXAMPLE 5

Single Column Purification of $C_{60}$ and $C_{70}$ Fullerene

A slurry of alkaline decolorizing carbon Norit®-A (400 g) and silica gel (800 g) in 1:1 by volume orthodichlorobenzene (ODCB) was poured into a typical glass flash chromatography column (7 cm diameter column, 120 cm long) that had a cotton plug at the bottom of the column. The slurry was allowed to settle as the solvent above the stationary phase was allowed to drain under a 15 p.s.i. $N_2$ head pressure applied at the top of the column. The stationary phase was not allowed to become solvent free in order to avoid cracking of the stationary phase. The settled stationary phase was 75 cm long. A solution of carbon arc soot-extracted crude fullerenes (10.00 g, 36% $C_{70}$ by HPLC analysis) in 1:1 ODCB/toluene (666 mL) was slowly introduced to the top of the column and a $N_2$ head pressure of 15 p.s.i. was applied providing a 15 mL/min elution rate. Utilization of this procedure behind a protective transparent shield prevents injury in the event of a column rupture. Additionally, tape-wrapped columns provide added protection. As more solvent was needed, the stopcock at the bottom of the column was closed, the pressure released, and more solvent was added. After 2516 mL (Fraction 1) of solute-free mobile phase had eluted from the column, elution of a purple $C_{60}$ band occurred, and collection of Fraction 2 was started. Fraction 2 totalled 1520 mL and contained 5.97 g of $C_{60}$ that was >99.9% pure by HPLC analysis. After Fraction 2 had become almost colorless, the red/brown color of $C_{70}$ was first noticed. At the first indication of the $C_{70}$, Fraction 3 was collected, and the mobile phase was changed to pure ODCB. Fraction 3 was 750 mL and contained 1.30 g of a mixture of $C_{60}$ and $C_{70}$ in a 58:42 ratio. At the end of Fraction 3, the color of the eluant darkened from a light red/brown to nearly black, indicating that the pure ODCB had reached the bottom of the column. The ODCB brought with it most of the $C_{70}$, and Fraction 4 was begun. Fraction 4, an enriched $C_{70}$ fraction, was collected and monitored by HPLC until the purity of the $C_{70}$ in the eluant had reached 90%. Fraction 4 was 750 mL and contained 0.65 g of $C_{70}$ at 85% purity. A Fraction 5, the final $C_{70}$ fraction, was then collected. Fraction 5 was 10 L and contained 1.58 g of $C_{70}$ at >97% purity. The combined fractions weighed 9.50 g giving 95% mass recovery from the column. If one assumes that the remaining mass was due to higher fullerenes, one can conclude that this purification method is nearly quantitative. Additional column work on the impure fractions may yield ~3 g of >97% pure $C_{70}$ from a 10 g batch crude.

Solvent was removed from the different fractions via rotary evaporation with aspirator pressure and an ice-cooled condenser. In fractions containing mixed solvents, the toluene was first removed at 40° C., and the ODCB was then recovered at 85° C. This proved to be a fast and efficient method of solvent recovery. Over the course of this purification, 13 L of ODCB were used, and 12.4 L were recovered giving a 95% recovery of ODCB. Rotary evaporation is preferred as fractional distillation results in a codistillation of the fullerenes.

A comparison of the time and expense required to purify one gram of Buckminsterfullerene according to the method of the present invention as compared to conventional methods is shown in Table 1. As can be seen from Table 1, the present invention provides a method for purification of fullerenes which gives a high recovery of pure fullerene from starting material at a low solvent and stationary phase cost, which is 24 to 96 times faster than other known purification methods.

TABLE 1

| Separation Material Technique | Cost of Eluent Solvent and Stationary Phase ($) | Starting Material Cost ($) | Amount (g) of Starting Material to Obtain 1 g of $C_{60}$ Fullerene | Time (Hrs) | Price Per Gram Purified Product ($) |
| --- | --- | --- | --- | --- | --- |
| [1]Alumina | 204 | 1,667 | 1.85 | 24+ | 1,871 |
| [2]Powdered Graphite | 72 | 2,812 | 3.125 | 12 | 2,884 |
| [3]Gel* Permeation | .35 | 1,062 | 1.18 | 48+ | 1,062 |
| [4,5]Alumina | 5 | 2,727 | 3.00 | 11 | 2,732 |
| (Soxhlet Extraction) | 31 | 2,093 | 2.33 | 30 | 2,124 |
| Example 1- | 2 | 1,197 | 1.33 | 4 | 1,199 |

TABLE 1-continued

| Separation Material Technique | Cost of Eluent Solvent and Stationary Phase ($) | Starting Material Cost ($) | Amount (g) of Starting Material to Obtain 1 g of $C_{60}$ Fullerene | Time (Hrs) | Price Per Gram Purified Product ($) |
| --- | --- | --- | --- | --- | --- |
| Active Carbon Example 2- Active Carbon/Silica Gel | 2 | 1,359 | 1.51 | 0.5 | 1,361 |

[1] Wudl, F.; Koch, A. S.; Khemani, K. C. J. Org. Chem. 1991, 56, 4543
[2] Vassallo, A. M.; Palisano, A. J.; Pang, L. S. K.; Wilson, M. A. J. Chem Soc., Chem Comm. 1992, 1, 60
[3] Meier, M. S.; Selegue, J. P. J. Org. Chem. 1992, 57, 1924
[4] Chatterjee, K. et al. J. Org. Chem. 1992, 57, 3253
[5] Wudl, F.; Khemani, K.C.; Prato, M. J. Org. Chem. 1992, 57, 3253
*Solvent cost only

We claim:

1. A method of purifying a mixture of fullerenes to obtain a preparation enriched in a fullerene of a selected molecular weight comprising:

adding a fullerene mixture to the top end of a column comprising activated carbon, passing an eluting solvent comprising a chlorinated aromatic solvent in which said selected molecular weight fullerene is soluble through said column, and recovering a fraction enriched in the fullerene of a selected molecular weight relative to said fullerene mixture from the bottom end of the column.

2. A method according to claim 1 wherein said eluting solvent is ortho-dichlorobenzene.

3. A method according to claim 1 wherein said eluting solvent comprises a 1:1 mixture of toluene and orthodichlorobenzene.

4. A method of purifying a mixture of fullerenes to obtain apreparation enriched in a fullerene of a selected molecular weight comprising:

adding a fullerene mixture to the top end of a column comprising activated carbon, passing a solvent for $C_{60}$ fullerene selected from the group consisting of aromatics, halogenated alkanes, halogenated alkenes and halogenated alkynes and mixtures thereof through said column, recovering a fraction enriched in $C_{60}$ fullererie relative to said fullerene mixture from the bottom end of said column, passing a chlorinated aromatic solvent through the column, and recovering a fraction enriched in a fullerene having a molecular weight greater than $C_{60}$ relative to said fullerene mixture from the bottom end of said column.

5. A method according to claim 4 wherein the solvent for $C_{60}$ fullerene is toluene.

6. A method according to claim 4 wherein the solvent for $C_{60}$ fullerene is a 1:1 mixture of toluene and ortho-dichlorobenzene.

7. A method according to claim 1 or claim 4 wherein the fullerene mixture is in the form of a solution.

8. A method according to claim 1 or claim 4 wherein the fullerene mixture is soot.

9. A method according to claim 1 or claim 4 wherein said column also comprises silica gel.

10. A method according to claim 8 wherein the ratio by weight of activated carbon to silica gel is 1:2.

11. A method according to claim 1 or claim 4 wherein solvent is driven through the column by applying 5 p.s.i. to 5000 p.s.i to one end of the column.

* * * * *

UNITED STATES PATENT AND TRADEMARK OFFICE
CERTIFICATE OF CORRECTION

PATENT NO. : 5,662,876

DATED : September 2, 1997

INVENTOR(S) : Tour et al.

It is certified that error appears in the above-identified patent and that said Letters Patent is hereby corrected as shown below:

Col. 1, line 19, "Carbon" should read --carbon--;

Col. 1, line 20, "$C_{20}+2$ m.", should read --$C_{20+2m}$--;

Col. 1, line 51, "Very" should read --very--;

Col. 2, line 60, "diatomaCeous" should read --diatomaceous--;

Col. 3, line 11, "SUitable" should read --Suitable--;

Col. 4, line 43, "mmdiameter" should read --mm diameter--;

Col. 5, line 26,"Norite-A" should read --Norit [(R)]-A--;

Col. 5, line 43,"$N_2$head" should read --$N_2$ head--; and,

Col. 7, line 39,"apreparation" should read --a preparation--

Signed and Sealed this

Ninth Day of December, 1997

BRUCE LEHMAN

*Attest:*

*Attesting Officer*     *Commissioner of Patents and Trademarks*